(12) United States Patent
Xiong (10) Patent No.: US 7,716,233 B2
(45) Date of Patent: May 11, 2010

(54) SYSTEM AND METHOD FOR PROCESSING QUERIES FOR COMBINED HIERARCHICAL DIMENSIONS

(75) Inventor: Wuzhen Xiong, Bussy St. Georges (FR)

(73) Assignee: Business Objects Software, Ltd., Dublin (IE)

( * ) Notice: Subject to any disclaimer, the term of this patent is extended or adjusted under 35 U.S.C. 154(b) by 283 days.

(21) Appl. No.: 11/752,808

(22) Filed: May 23, 2007

(65) Prior Publication Data

US 2008/0294596 A1   Nov. 27, 2008

(51) Int. Cl.
*G06F 17/30* (2006.01)
(52) U.S. Cl. .................... 707/759; 707/776
(58) Field of Classification Search ............ 707/4, 707/10, 101, 104.1
See application file for complete search history.

(56) References Cited

U.S. PATENT DOCUMENTS

| | | | |
|---|---|---|---|
| 7,363,287 B2* | 4/2008 | Kilmer et al. | 707/2 |
| 2002/0091681 A1* | 7/2002 | Cras et al. | 707/3 |
| 2002/0133504 A1* | 9/2002 | Vlahos et al. | 707/104.1 |
| 2005/0149552 A1* | 7/2005 | Chan et al. | 707/102 |
| 2007/0208723 A1* | 9/2007 | Peterson et al. | 707/4 |
| 2008/0201293 A1* | 8/2008 | Grosset et al. | 707/2 |

* cited by examiner

*Primary Examiner*—Leslie Wong
(74) *Attorney, Agent, or Firm*—Cooley Godward Kronish LLP (57) ABSTRACT

An abstract query is received for querying data sources for a combined hierarchical dimension having at least one hierarchy. The abstract query is mapped into data source specific queries by generating context expressions according to the at least one hierarchy. The data source specific queries are executed in an order according to the at least one hierarchy to produce value results for the combined hierarchical dimension.

19 Claims, 6 Drawing Sheets

SYSTEM AND METHOD FOR PROCESSING QUERIES FOR COMBINED HIERARCHICAL DIMENSIONS

BRIEF DESCRIPTION OF THE INVENTION

This invention relates generally to data retrieval and processing. More particularly, this invention relates to receiving and processing abstract queries associated with hierarchical dimensions.

BACKGROUND OF THE INVENTION

Business Intelligence generally refers to software tools used to improve business enterprise decision-making. These tools are commonly applied to financial, human resource, marketing, sales, customer, and supplier analyses. More specifically, these tools can include reporting and analysis tools to present information, content delivery infrastructure systems to deliver and manage reports and analytics, data warehousing systems to cleanse and consolidate information from disparate sources, and database management systems ("DBMS") that are used to organize, store, retrieve, and manage data in databases, such as relational, Online Transaction Processing ("OLTP") and Online Analytic Processing ("OLAP") databases.

In many organizations data is stored in multiple data sources that are not readily compatible. Each type of data source may be used for different purposes, with, in general. OLTP databases used to store transaction-oriented data, relational databases used to store and organize data according to data relations, and OLAP databases used to store data requiring analytical processing. For example, organizational data for a sales department may be distributed among an OLTP database for storing real-time sales transactions, a relational database for storing data pertaining to customers, and an OLAP database for storing sales history data according to product, geographical regions, and time period. Retrieving sales data for analysis may therefore require multiple queries to multiple databases.

The efficacy of a query in producing a result often depends on the storage structure of the underlying data source. Because OLAP databases are designed to store multi-dimensional data in summarized or aggregated form, they can respond quickly. OLTP and relational databases may have to process tens of thousands of individual records to answer the same query.

Using the sales example above, consider a marketing manager trying to learn why the sales of a certain product were not profitable during a given time period. The manager may browse an OLAP data cube to narrow the profitability problem down to the most detailed information in the cube. The manager may learn that during one specific month, the product's profitability was significantly low in the West Coast region. If the manager were to use an OLTP or relational database to answer the same query, the sales transactions for all customers stored in the database would have to be added before determining which region was responsible for the low profits.

Now suppose the manager wants to investigate which customers and sales representatives were involved in the West Coast transactions during the low profit period. Since the OLAP database only provides aggregated data, raw data items that have not been included in the aggregation would necessarily require the manager to query the OLTP and/or relational databases.

These databases are, therefore, complimentary. A user must be able to navigate between them to solve business problems. For example, a user must be able to "drill-down" from one database to another to acquire more details on a specific data object. Conversely, a user must also be able to "drill-up" from one database to another to reduce the level of detail regarding the object. In doing so, it would be advantageous to insulate the user from the complexities of the underlying data sources.

Currently-available DBMSs tend to provide limited drill-through and drill-up capabilities. For example, OLAP servers such as Analysis Services provided by Microsoft Corp. of Redmond, Wash., Essbase Analytics provided by Hyperion Solutions Corp. of Santa Clara, Calif., and Oracle Business Intelligence Discoverer provided by Oracle Corp. of Redwood Shores, Calif., support only the simplest drill-through scenarios between two OLAP and relational data sources with proprietary API or query language extensions. Drill-through is performed only to a raw SQL table without reaching more basic reporting levels. Some configurations may even require that drill-through results be a part of the OLAP data cube, thereby increasing the cube complexity and data size as the cube must include additional attributes and measures. In addition, these OLAP servers may also pose security risks due to a lack of user access control over drill-through capabilities.

Because of these limitations, users have not been able to leverage the complimentary aspects of the different data sources to their full advantage. There is no business intelligence tool available today, that, either alone or working in tandem, offers users full navigation between multiple data sources without limitation on the number and type of data sources. There also is no business intelligence tool that provides full transparency of execution when performing drill-down or drill-up actions. As a result, managing the data needs of a business enterprise that deals with large amounts of data spread across multiple data sources with different storage structures can be, at best, cumbersome.

SUMMARY OF THE INVENTION

The invention includes a method of querying data sources. An abstract query is received for querying the data sources for a combined hierarchical dimension having at least one hierarchy. The abstract query is mapped into data source specific queries by generating context expressions according to the at least one hierarchy. The data source specific queries are executed in an order according to the at least one hierarchy to produce value results for the combined hierarchical dimension.

The invention also includes a system with a business intelligence module for defining an abstract query for querying data sources for a combined hierarchical dimension having at least one hierarchy. A query engine module is configured to map the abstract query into data source specific queries by generating context expressions according to the at least one hierarchy. Data source specific queries are executed in an order according to the at least one hierarchy to produce value results for the combined hierarchical dimension.

The invention also includes a software arrangement provided on a computer-accessible medium for querying data sources for a combined hierarchical dimension having at least one hierarchy. A first module defines an abstract query for querying the data sources for the combined hierarchical dimension. A second module is configured to execute the abstract query according to the at least one hierarchy to produce value results for the combined hierarchical dimension by mapping the abstract query into data source specific queries having context expressions according to the at least one hierarchy.

The invention also includes a computer readable storage medium with executable instructions to receive an abstract query specifying first and second levels in a combined hierarchical dimension. The first level references a primary first data source and the second level references a primary second data source. A first data source specific query specifying the first level for the first data source is generated. The first data source specific query is executed against the first data source to produce results for the first level. The results for the first level include a value for the first level. A context expression is generated for the second data source. The context expression specifies the value for the first level. A second data source specific query specifying the second level and including the context expression for the second data source is generated. The second data source specific query is executed against the second data source to produce results for the second level. Results are returned for the first and second levels.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

The invention provides an open, metadata-based solution for navigation between any type and number of data sources. Data sources may include databases such as relational, transactional, hierarchical, multidimensional, object oriented, and the like. Further, data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open DataBase Connectivity (ODBC) and the like.

A semantic layer is provided that enables users to perform drill-down and drill-up actions between multiple data sources with the use of a single abstract query and without having to dissect the storage structure of the underlying data sources. The data sources may support combined hierarchical dimensions and include relational, OLTP, and OLAP databases, among others.

A combined hierarchical dimension may span at least one hierarchy having multiple levels in multiple data sources, with, for example, a first level referencing a primary data source and a second level referencing a secondary data source. The hierarchy may be a value-based or measure-based hierarchy. For example, a geographical hierarchy may be a combined hierarchical dimension stored in both an OLAP cube and a relational database. The OLAP cube may store aggregated data for countries and states, while the relational database may store detailed data pertaining to cities.

In one exemplary embodiment, an abstract query may be formulated by a user for querying a plurality of data sources for a combined hierarchical dimension having at least one hierarchy. The abstract query may be mapped into a plurality of data source specific queries by generating context expressions according to the at least one hierarchy. The plurality of data source specific queries may then be executed in an order according to the at least one hierarchy to produce value results for the combined hierarchical dimension. In this embodiment, a data source specific query specifying a first level in a hierarchy may be generated and executed to return value results for the first level prior to generating and executing another data source specific query for a second level in the hierarchy with a context expression relating the second level to the first level.

In the geographical example above, an abstract query for information on a given city in a given state may return results for the country and state from the OLAP cube and for the city from the relational database. A context expression may be used when querying the relational database to specify the state where the city is located. The context expression may be, for example, a filter such as SQL's "WHERE" clause.

Advantageously, the present invention allows users to query any type and number of data sources with a single query statement. The single query enables higher levels of a hierarchical dimension to be extracted from an aggregated data source such as an OLAP database for speed and lower levels of the hierarchy representing detailed data to be extracted from another data source. The results extracted from the multiple data sources may be displayed in a single data tab, thereby complying with the multi-dimensional reporting model of the BI tools available today. From a user's perspective, all drill-down and drill-up actions are transparently executed.

Generally, the present invention provides a system, method, software arrangement, and computer readable storage medium for processing queries for combined hierarchical dimensions in multiple data sources. The queries are processed based on a semantic layer that provides terms and abstracted logic associated with the underlying data in the data sources.

According to the present invention, the semantic layer comprises a semantic abstraction with data model objects that describe an underlying data source and represent, define, and provide metadata for dimensions, attributes and measures in a data source. Data model objects can contain calculations from, be based on, or be designed to be applied to an underlying data source. Metadata that characterizes how to access a data source forms a data foundation for the semantic layer.

As generally used herein, a dimension may represent the side of a multi-dimensional data cube, a category, a column, or a set of data items within a data source. For example, each dimension in a data source may represent a different category such as a geographical region, time, or product time. A dimension may also be divided into levels, for example, the dimension "time" may be divided into "years," "quarters," "months," and "days."

The levels within a dimension may generally (but not necessarily) correspond to different depths within a hierarchy and may contain one or more members, for example, "years" may contain members "2004," "2005," and "2006." Members represent a distinct value within a dimension and can exist within one or more hierarchies. Each member of a dimension may be associated with a unique ID, display name, and one or more attribute values, e.g., a "customer" dimension might have attribute values for age, gender, and phone. Members of a dimension may be defined through a filter or transform.

A dimension supporting a hierarchy may be referred to as a "hierarchical dimension." A typical example is a geography hierarchy where dimension levels include country, state, city, store and the like, with each level having one or more dimension members. A combined hierarchical dimension refers to a hierarchical dimension that spans multiple data sources.

Figure 1:
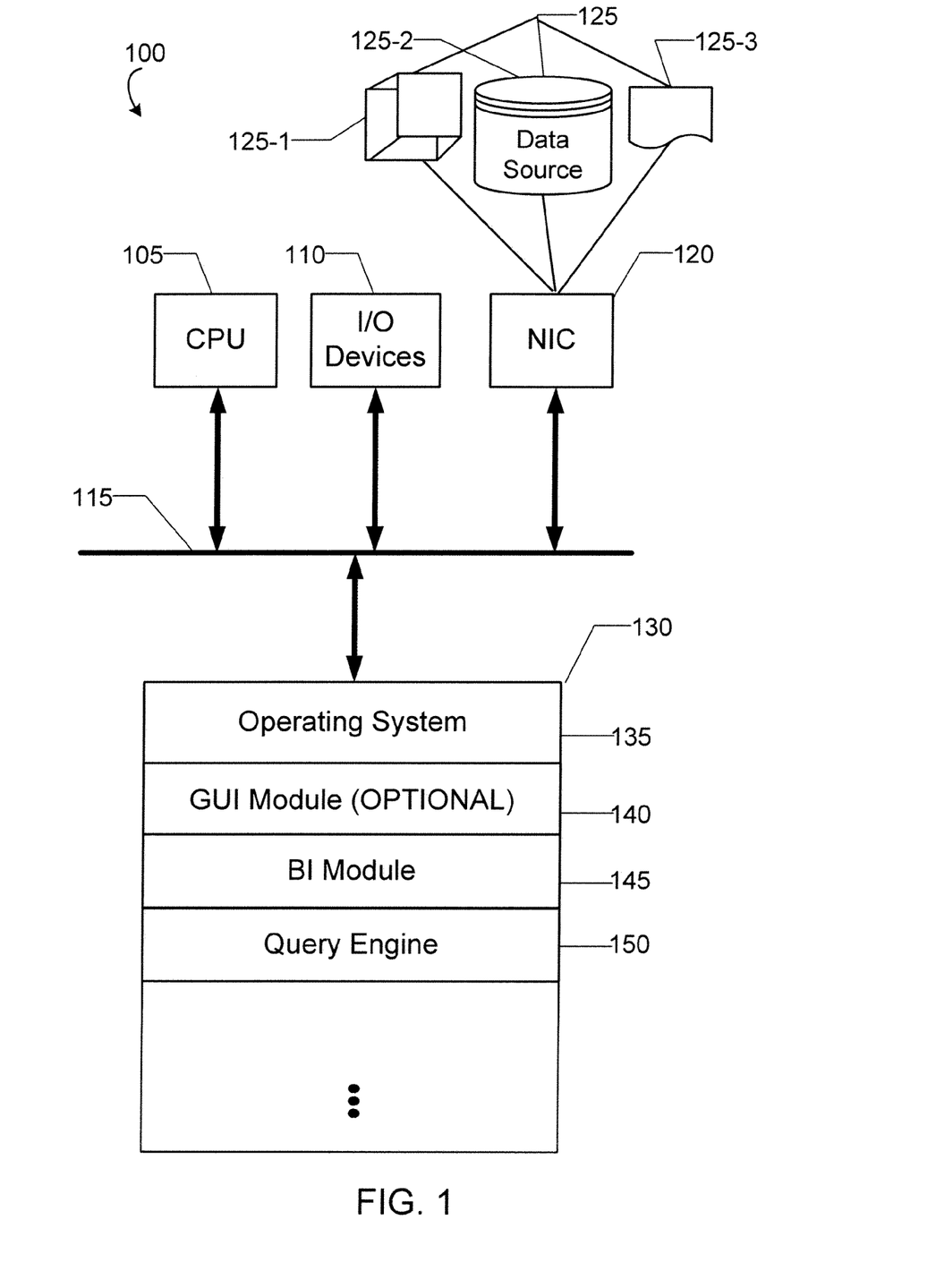
FIG. 1 illustrates a system constructed in accordance with an embodiment of the invention.

Referring to FIG. 1, a computer configured in accordance with an embodiment of the invention for implementing software instructions for processing queries for combined hierarchical dimensions on multiple data sources is provided. Computer 100 includes standard components, including a Central Processing Unit ("CPU") 105 and input/output devices 110, which are linked by a bus 115. Input/output devices 110 may include a keyboard, mouse, touch screen, monitor, printer, and the like.

Network Interface Circuit ("NIC") 120 is also connected to the bus 115. NIC 120 provides connectivity to a network (not shown), thereby allowing computer 100 to operate in a networked environment. For example, networked data sources 125 are connected to computer 100 through NIC 120. In accordance with the present invention, networked data sources 125 may include any number and type of data sources, such as, for example, OLAP, OLTP and relational databases, among others.

Memory 130 is also connected to the bus 115. In one exemplary embodiment, memory 130 stores one or more of the following modules: an operating system module 135, an optional Graphical User Interface ("GUI") module 140, a Business Intelligence ("BI") module 145 and a query engine module 150.

Operating system module 135 may include instructions for handling various system services, such as file services or for performing hardware dependant tasks. The optional GUI module 140 may rely upon standard techniques to produce graphical components of a user interface, e.g., windows, icons, buttons, menu and the like, examples of which are discussed below.

BI module 145 includes executable instructions to perform BI-related functions, such as, defining abstract queries and analyses, producing reports, accessing document storage repositories, and the like. Query engine module 150 includes executable instructions for accessing data sources such as networked data sources 125 and for executing data source queries and returning query results. The query engine module 150 may be implemented with a semantic layer.

In accordance with the present invention, query engine module 150 includes executable instructions for accessing multiple data sources and processing queries for combined hierarchical dimensions that span the data sources. Query engine module 150 may include instructions for processing an abstract query specifying multiple data sources, generating data source specific queries specifying levels in each data source, generating context expressions to relate one level to another, applying the context expressions in the data source specific queries, executing the data source specific queries, returning results for all levels in the queries, and reporting the results, among other instructions.

It should be appreciated that the executable modules stored in memory 130 are exemplary. It should also be appreciated that the functions of the modules may be combined. In addition, the functions of the modules need not be performed on a single machine. Instead, the functions may be distributed across a network, if desired. Indeed, the invention may be commonly implemented in a client-server environment with various components being implemented at the client-side and/or the server-side. As understood by those of ordinary skill in the art, it is the functions of the invention that are significant, not where they are performed or the specific manner in which they are performed.

Figure 2:
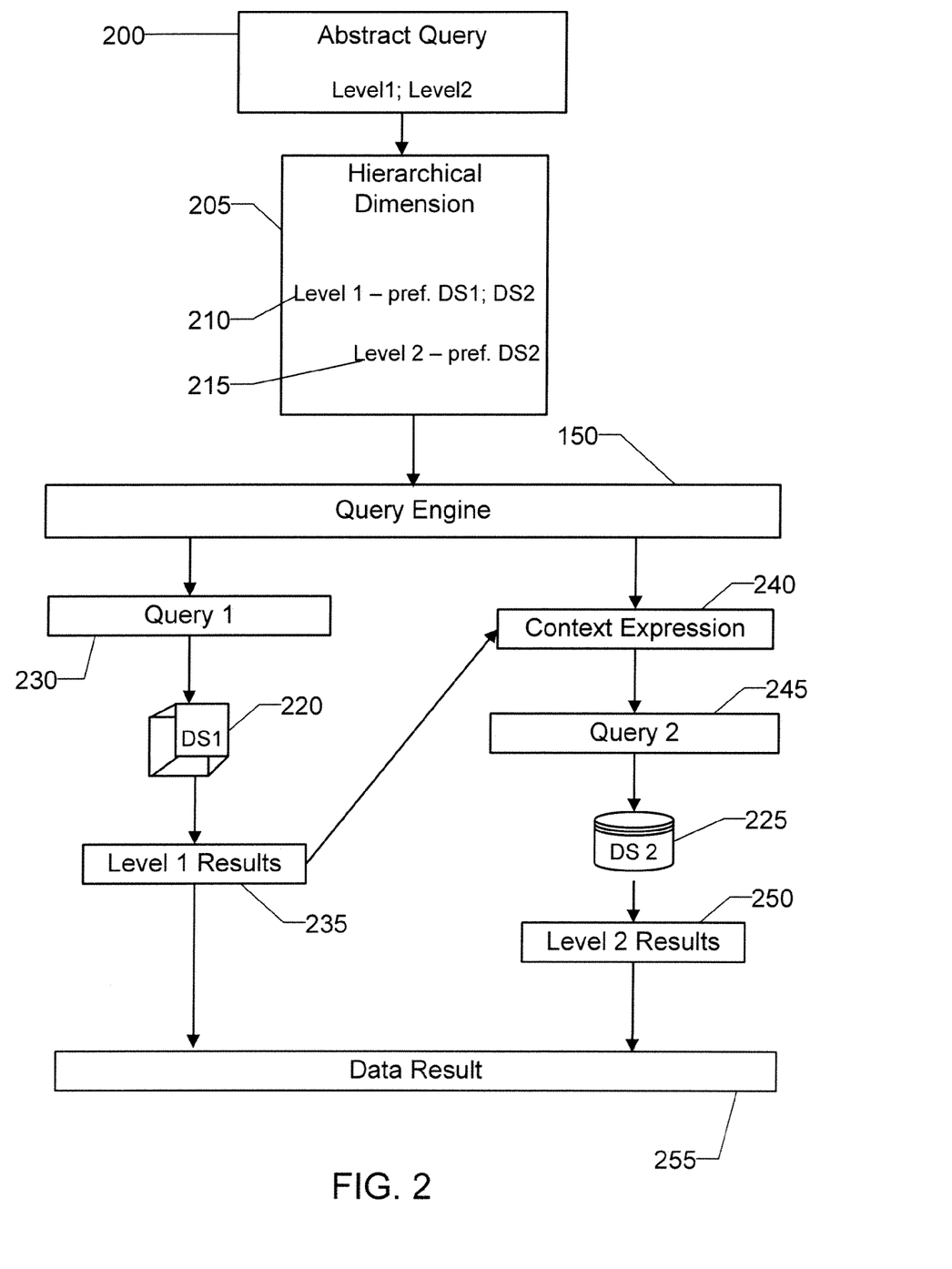
FIG. 2 illustrates an architecture for implementing a query in accordance with an embodiment of the invention.

Referring now to FIG. 2, an architecture for implementing a query in accordance with an embodiment of the invention is described. An abstract query 200 may be formulated by a user to access information from any number and type of data sources. The abstract query 200 may be, for example, in the form of a query statement such as:

QUERY ($DS_1 \cdot \exp_1, DS_2 \cdot \exp_2, \ldots, DS_n \cdot \exp_n$)

where $DS_i$ stands for data source i and $\exp_i$ stands for expression i. The expressions may include any valid select clause from a given data source, such as a table column, an OLAP level, a measure, or a value.

The QUERY statement above applies a metadata-based model for taking as parameters a list of expressions from different data sources. The parameters may be listed according to the storage structure of the data sources, with, in general, the most aggregated data sources listed first. Each parameter may correspond to a different level in a hierarchical dimension 205. For example, the query statement QUERY ($DS_1, \exp_1, DS_2 \cdot \exp_2$) may be used to access information from two levels in hierarchical dimension 205, namely, level 210 and level 215. Information pertaining to each level may be stored in one or both of $DS_1$ 220 and $DS_2$ 225, e.g., level 210 may be stored in $DS_1$ 220 and $DS_2$ 225, and level 215 may be stored in $DS_2$ 225.

Using the geographical hierarchy example above, level 210 may represent states in a given country and level 215 may represent cities within the states. Information about the states may be available in both data sources $DS_1$ 220 and $DS_2$ 225, with, for example, $DS_1$ 220 containing aggregated information and $DS_2$ 225 containing detailed information about each level. $DS_1$ 220 may be, for example, an OLAP database, and $DS_2$ 225 may be a relational database.

The abstract query 200 for hierarchical dimension 205 is processed by query engine 150 to return results for levels 210 and 215 from both $DS_1$ 220 and $DS_2$ 225. Since information on level 210 is stored in aggregated form in $DS_1$ 220, query engine 150 may retrieve results for level 210 faster by accessing $DS_1$ 220 instead of $DS_2$ 225. To do so, query engine 150 generates and executes a data source specific query 230 specifying level 210 against $DS_1$ 220 to produce value results 235 for level 210. Data source specific query 230 may be, for example, a SQL or MDX query against $DS_1$ 220.

To retrieve results pertaining to level 215 from $DS_2$ 225, query engine 150 generates context expression 240. Context expression 240 specifies a connection context instance or execution context instance to be used for a query statement. Context expression 240 may be, for example, a filter such as SQL's "WHERE" clause for specifying that level 215 information is to be extracted from $DS_2$ 225 with reference to level 210 in $DS_1$ 220.

A data source specific query 245 may then be generated by specifying level 215 and applying context expression 240 against $DS_2$ 225 to produce value results 250 for level 215.

Data result 255 listing value results 235 for level 210 and value results 250 for level 215 may also be generated and reported by query engine 150.

Figure 3:
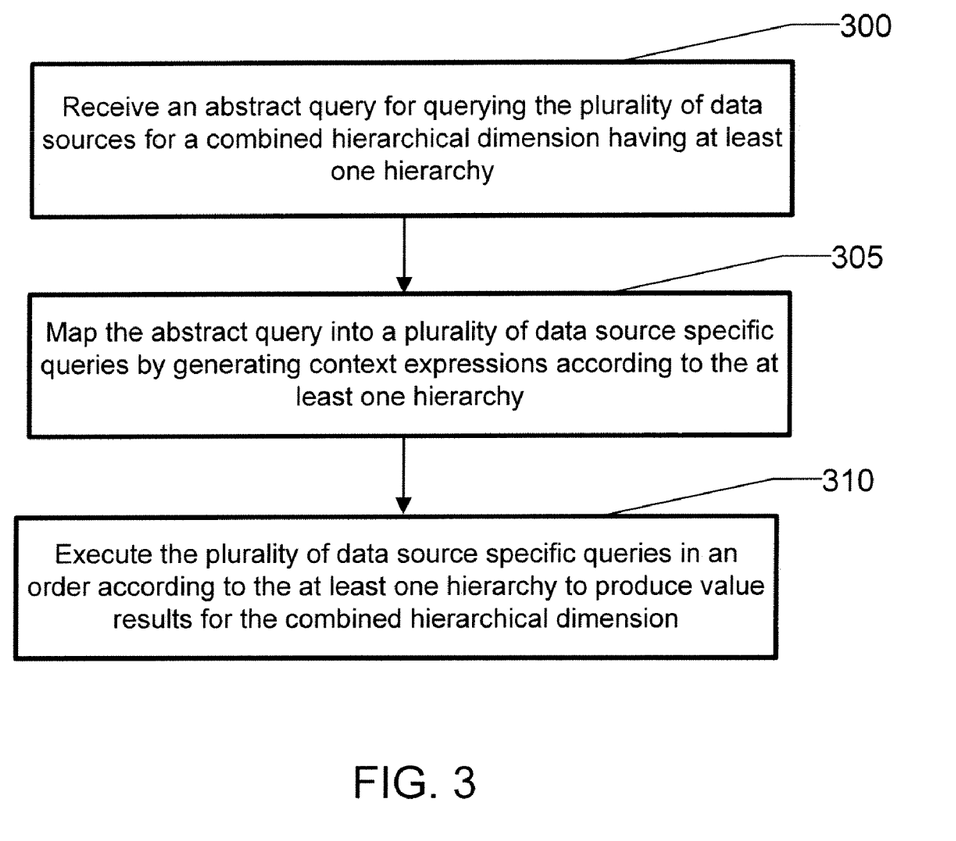
FIG. 3 illustrates a flow chart for processing a query for a combined hierarchical dimension associated with an exemplary embodiment of the invention.

Referring now to FIG. 3, a flow chart for processing a query for a combined hierarchical dimension associated with an exemplary embodiment of the invention is described. Initially, query engine 150 receives an abstract query for querying a plurality of data sources for a combined hierarchical dimension having at least one hierarchy (300). The plurality of data sources may contain data sources of different types, e.g., OLAP, OLTP, and relational databases, and the combined hierarchical dimension may have multiple hierarchies with multiple levels spanning one or more data sources.

The query engine 150 maps the abstract query into a plurality of data source specific queries by generating context expressions according to the at least one hierarchy (305). Each data source specific query may specify a level in a hierarchy and apply a context expression to relate the level to another level in the hierarchy.

For example, consider a hierarchy having two levels, a primary level and a secondary level. A data source specific query may be generated for accessing the primary level in a primary data source. Another data source specific query may be generated for accessing the secondary level in a secondary data source, with a context expression relating the secondary level to the primary level. The primary and secondary levels may be, for example, parent-child levels with the child/secondary level representing more detailed information regarding the parent/primary level.

The data source specific queries can be executed according to the at least one hierarchy to produce value results for the combined hierarchical dimension (310). The data source specific queries can be executed in hierarchical order to produce value results for each level in the hierarchy before moving on to another level based on the context expressions.

Not all data source specific queries need to be generated prior to the execution operation (310). That is, a data source specific query for a given level in the hierarchy may be generated after executing a data source specific query for another level in the hierarchy that is related to the given level with a context expression. For example, a data source specific query for a child/secondary level may be generated after executing a data source specific query for a parent/primary level in the hierarchy. Conversely, a data source specific query for a parent/primary level may be generated after executing a data source specific query for a child/secondary level in the hierarchy.

In one exemplary embodiment, the data source specific queries accessing aggregated data sources, e.g., OLAP databases, may be generated and executed prior to the data source specific queries accessing detailed data sources, e.g., OLTP and relational databases, as aggregated data sources may be accessed faster than more detailed ones.

In another exemplary embodiment, users may specify the order in which the data source specific queries are executed. For example, users may specify that aggregated information is to be accessed only from aggregated data sources and before accessing other detailed information. Users may also specify one or more optimization rules and drill-down and drill-up options for accessing the data sources.

Figure 4:
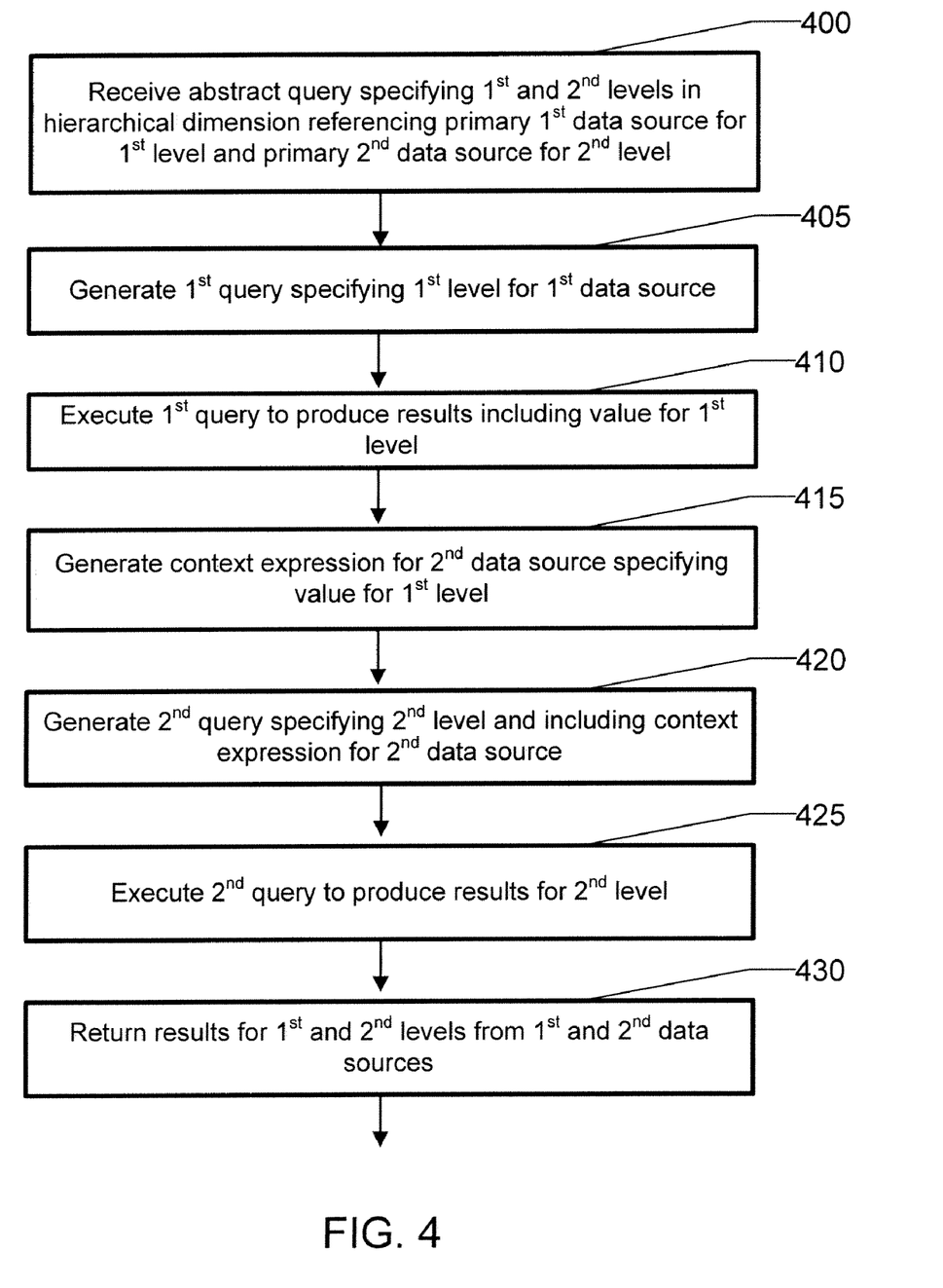
FIG. 4 illustrates a flow chart for processing a query for a combined hierarchical dimension including two levels according to an exemplary embodiment of the invention.

Referring now to FIG. 4, a flow chart for processing a query for a combined hierarchical dimension including two levels associated with an embodiment of the invention is described. Query engine 150 receives an abstract query specifying first and second levels in a combined hierarchical dimension spanning two data sources, with the first level referencing the first data source and the second level referencing the second data source (400). To retrieve results for the first level, a first query specifying the first level is generated by the query engine 150 to be executed against the first data source (405). The query is then executed to produce a result including a value for the first level (410).

A context expression specifying the obtained value for the first level is generated for the second data source (415). The context expression is used in a query specifying the second level against the second data source (420). The query is then executed to produce results for the second level (425). The results for the first and second levels are then returned and reported by query engine 150 (430).

It should be understood by one skilled in the art that the processing operations illustrated above with reference to FIG. 4 are for illustration purposes only. Additional dimension levels may be included in abstract queries received by query engine 150 without deviating from the scope of the invention.

Figure 5:
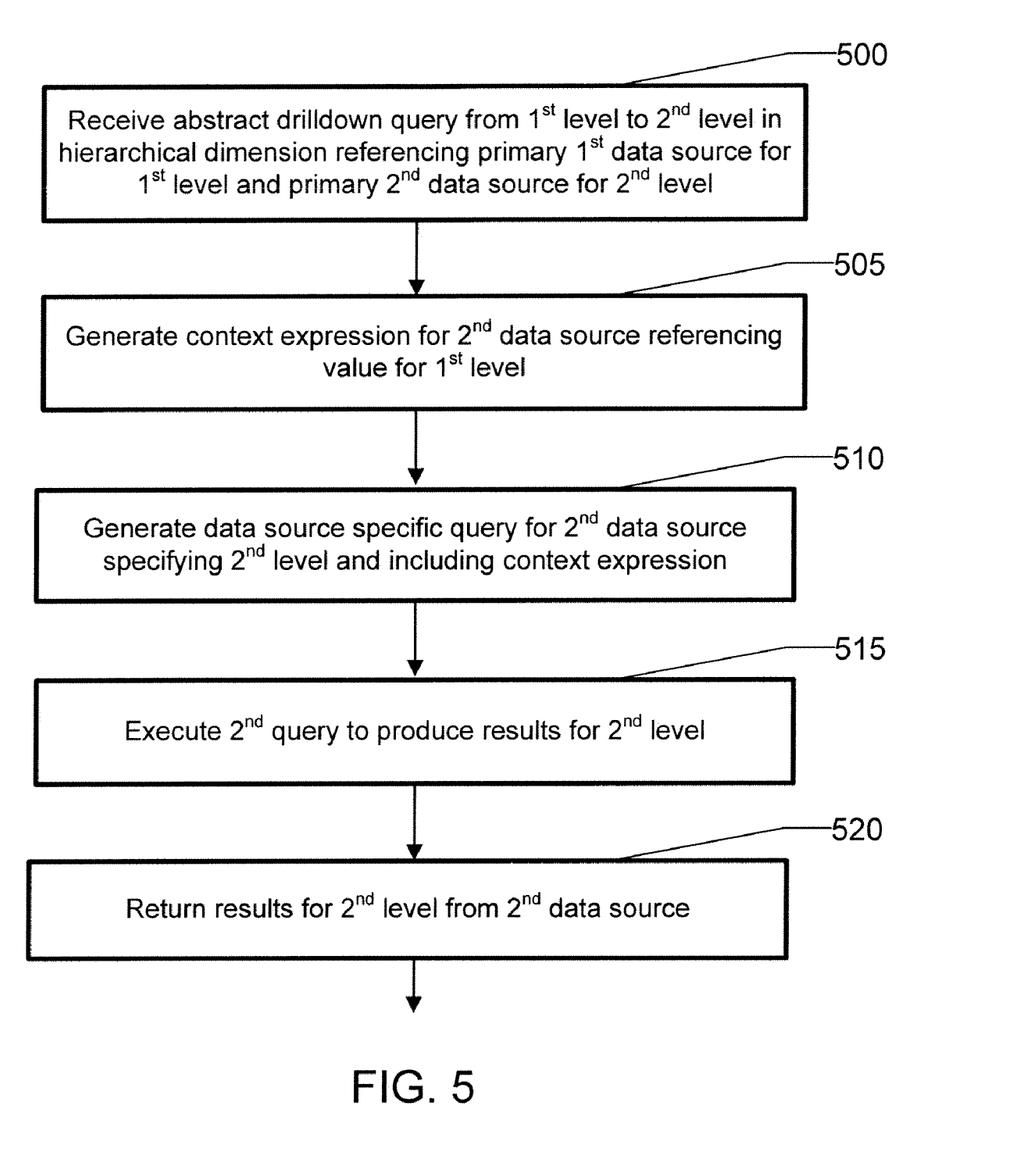
FIG. 5 illustrates a flow chart for processing an abstract drill-down query for a combined hierarchical dimension including two levels according to an exemplary embodiment of the invention.

Referring now to FIG. 5, a flow chart for processing an abstract drill-down query for a combined hierarchical dimension including two levels according to an exemplary embodiment of the invention is described. Query engine 150 receives an abstract drill-down query from a first to a second level in a combined hierarchical dimension spanning two data sources, with the first level referencing the first data source and the second level referencing the second data source (500). A context expression referencing a value for the first level is generated for the second data source (505). The context expression is used to generate a query specifying the second level against the second data source (510). The query is then executed (515) to produce and report results for the second level (520).

It is appreciated that the steps illustrated above with reference to FIG. 5 for processing an abstract drill-down query may also be used for processing an abstract drill-up query. In that case, the abstract query is performed from a more detailed level of the hierarchical dimension to a less detailed one, for example, from a table column in a relational database to a measure in an OLAP cube.

Figure 6:
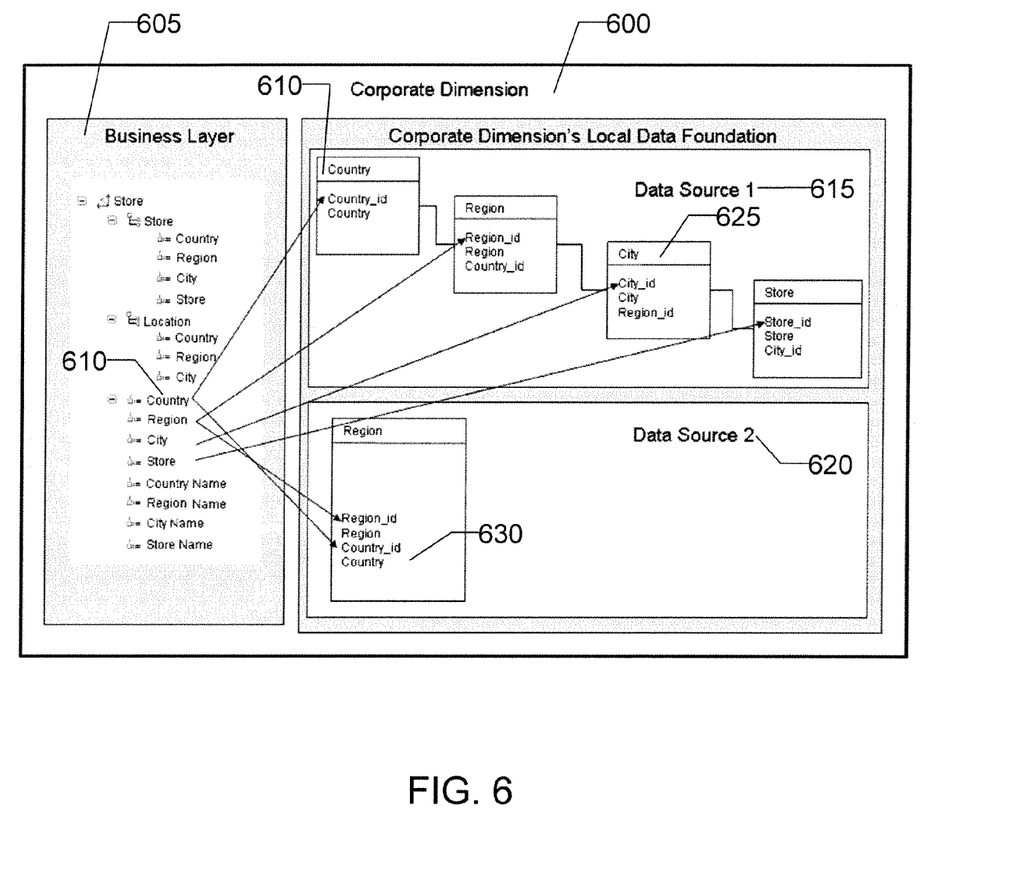
FIG. 6 illustrates an example of a data map for a combined hierarchical dimension in accordance with an embodiment of the invention.

An example of a data map for a combined hierarchical dimension in accordance with an embodiment of the invention is shown in FIG. 6. Data map 600 includes a hierarchical dimension showing data for a corporation. The data map 600 includes a business data layer 605 having multiple dimension levels 610 of a geographical hierarchy, such as levels specifying a country, region, city, and store.

Dimension levels 610 may be accessed from one or both of data sources 615 and 620. For example, the dimension level 610 specifying a "country" is shown as a parent in a hierarchy within data source 615 that also includes dimensions 610 for "region," "city," and "store." Dimension level 610 for "region" may also be accessed from data source 620.

Each dimension level 610 may have one or more attributes. Dimension level 610 for "city" for example, includes attributes 625 for a city ID and for a region ID for the region where the city is located. Similarly, dimension level 610 for "region" includes attributes 630 for a region ID and for a country ID for the country where the region is located.

It is appreciated that when a user formulates an abstract query for accessing information on one or more of dimension levels 610, query engine 150 generates data source specific queries for data sources 615 and 620. Each data source specific query specifies a given dimension level and may include context expressions relating one level to another. For example, a data source specific query for a "city" contains a context expression for specifying a value for a "region" where the city is located.

It is also appreciated that users are insulated from the complexities of the storage structure of the underlying data sources 615 and 620 when accessing the information shown in data map 600. The simple abstract query is transparently executed, thereby facilitating user interaction and management of large amounts of data across multiple data sources.

In one exemplary embodiment, the present invention relates to a computer storage product with a computer-readable medium having computer code thereon for performing various computer-implemented operations for processing queries for combined hierarchical dimensions. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another exemplary embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of querying a plurality of data sources, the method comprising:
    receiving an abstract query for querying the plurality of data sources, wherein the abstract query specifies a first data source with a first level and a second data source with a second level thereby defining a multiple source hierarchical dimension;
    generating a first data source specific query specifying the first level of the first data source;
    executing the first data source specific query against the first data source to produce results for the first level, wherein the results for the first level include a value for the first level;
    generating a context expression for the second data source, wherein the context expression relates the first level to the second level;
    generating a second data source specific query specifying the second level and including the context expression for the second data source;
    executing the second data source specific query against the second data source to produce results for the second level; and
    returning the results for the first level and the results for the second level.

2. The method of claim 1, wherein generating the context expression comprises generating at least one of a filter and a transform.

3. The method of claim 1, further comprising summarizing the value results for the combined hierarchical dimension into a single data tab.

4. A system for querying a plurality of data sources, the system comprising:
    a business intelligence module for defining an abstract query specifying multiple levels in multiple data sources, thereby defining a multiple source hierarchical dimension; and
    a query engine module configured to:
        generate a first data source specific query specifying a first level of a first data source;
        execute the first data source specific query against the first data source to produce results for the first level, wherein the results for the first level include a value for the first level;
        generate a context expression for a second data sour wherein the context expression relates the first level to a second level of a second data source;
        generate a second data source specific query specifying the second level and including the context expression for the second data source;
        execute the second data source specific query against the second data source to produce results for the second level; and
        return the results for the first level and the results for the second level.

5. The system of claim 4, wherein the plurality of data sources comprise a data source selected from: a relational database, a transactional database. a hierarchical database, a multidimensional database, an object oriented database, tabular data, data tagged with a markup language, and unstructured data.

6. The system of claim 5, wherein the abstract query is defined in a semantic abstraction that defines dimensions, attributes, measures, and metadata associated with a data source.

7. A computer readable storage medium, comprising executable instructions to:
    receive an abstract query specifying first and second levels in a multiple source hierarchical dimension, wherein the first level references a primary first data source, and the second level references a primary second data source;
    generate a first data source specific query specifying the first level for the first data source;
    execute the first data source specific query against the first data source to produce results for the first level, wherein the results for the first level include a value for the first level;
    generate a context expression for the second data source, wherein the context expression relates the first level to the second level;

generate a second data source specific query specifying the second level and including the context expression for the second data source;

execute the second data source specific query against the second data source to produce results for the second level; and return the results for the first and second levels.

8. The computer readable storage medium of claim 7, wherein the first data source is an Online Analytical Processing database and the second data source is a relational database.

9. The computer readable storage medium of claim 7, wherein the first level is a parent level and the second level is a child level.

10. The computer readable storage medium of claim 9, wherein the first level additionally references the second data source as a secondary data source.

11. The computer readable storage medium of claim 7, wherein at least one of the first and second levels additionally references a third data source.

12. The computer readable storage medium of claim 7, wherein the combined hierarchical dimension is defined in a semantic abstraction that describes at least one of the first data source and the second data source.

13. The computer readable storage medium of claim 12, wherein the combined hierarchical dimension is defined in at least two semantic abstractions.

14. The computer readable storage medium of claim 13, wherein the context expression is a first context expression, additionally comprising executable instructions to generate a second context expression, wherein the second context expression specifies a value for a third level in the multiple source hierarchical dimension.

15. The computer readable storage medium according to claim 14, wherein the second data source specific query additionally includes the second context expression.

16. The computer readable storage medium according to claim 7, wherein the abstract query, the first data source specific query and the second data source specific query additionally specify at least one of a measure and an attribute.

17. The computer readable storage medium according to claim 16, wherein the results additionally include results for at least one of the measure and the attribute.

18. A computer readable storage medium, comprising executable instructions to:

receive an abstract drill-down query from a first level in a first data source to a second level in a second data source forming a multiple source hierarchical dimension;

generate a first data source specific query specifying the first level for the first data source;

execute the first data source specific query against the first data source to produce results for the first level, wherein the results for the first level include a value for the first level;

generate a context expression for the second data source, wherein the context expression relates the first level to the second level;

generate a second data source specific query specifying the second level and including the context expression for the second data source;

execute the second data source specific query against the second data source to produce results for the second level; and return the results for the first and second levels.

19. A computer readable storage medium, comprising executable instructions to:

receive an abstract drill-up query from a first level in a first data source to a second level in a second data source forming a multiple source hierarchical dimension;

generate a first data source specific query specifying the first level for the first data source;

execute the first data source specific query against the first data source to produce results for the first level, wherein the results for the first level include a value for the first level;

generate a context expression for the second data source, wherein the context expression relates the first level to the second level;

generate a second data source specific query specifying the second level and including the context expression for the second data source;

execute the second data source specific query against the second data source to produce results for the second level; and return the results for the first and second levels.

* * * * *